US012647420B2

(12) United States Patent
Acharya et al.

(10) Patent No.: US 12,647,420 B2
(45) Date of Patent: Jun. 2, 2026

(54) SYSTEMS AND METHODS FOR SUBSTITUTING BORROWED RESOURCES ON A COMPUTER SYSTEM FOR OWNED RESOURCES

(71) Applicant: The Toronto-Dominion Bank, Toronto (CA)

(72) Inventors: Ravi Vasant Acharya, Philadelphia, PA (US); Christopher Mark Jones, Villanova, PA (US); Claude Bernell Lawrence, Jr., Philadelphia, PA (US)

(73) Assignee: The Toronto-Dominion Bank, Toronto (CA)

( * ) Notice: Subject to any disclaimer, the term of this patent is extended or adjusted under 35 U.S.C. 154(b) by 110 days.

(21) Appl. No.: 17/584,655

(22) Filed: Jan. 26, 2022

(65) Prior Publication Data

US 2023/0239299 A1    Jul. 27, 2023

(51) Int. Cl.
*H04L 9/40*          (2022.01)
(52) U.S. Cl.
CPC .................................... *H04L 63/10* (2013.01)
(58) Field of Classification Search
CPC .............................. H04L 63/10; H04L 63/102
See application file for complete search history.

(56) References Cited

U.S. PATENT DOCUMENTS

| | | | |
|---|---|---|---|
| 7,850,070 B2 | 12/2010 | Constantine | |
| 8,364,595 B1 * | 1/2013 | Ringewald ......... | G06Q 30/0601 |
| | | | 726/4 |
| 8,676,708 B1 | 3/2014 | Honey | |
| 8,751,376 B1 | 6/2014 | Wilkes | |
| 2007/0136194 A1 | 6/2007 | Sloan | |
| 2008/0065691 A1 * | 3/2008 | Suitts ............... | H04N 21/23439 |
| 2014/0165218 A1 * | 6/2014 | Lin ........................ | G06Q 30/06 |
| | | | 726/32 |
| 2014/0283129 A1 * | 9/2014 | Coronel .................. | G06F 21/10 |
| | | | 726/28 |
| 2019/0007399 A1 * | 1/2019 | Stevens, III ........ | H04W 12/084 |
| 2020/0364784 A1 | 11/2020 | Dill | |
| 2022/0040557 A1 * | 2/2022 | Tran ........................ | G06F 1/163 |

* cited by examiner

*Primary Examiner* — Mohammad A Siddiqi
(74) *Attorney, Agent, or Firm* — Rowand LLP

(57) ABSTRACT

Systems and methods are provided for receiving a first request to access a first borrowed resource in association with a first account, determining that a second account that is associated with the first account has access to a first owned resource corresponding to the first borrowed resource, and in response to determining that the second account has access to the first owned resource, allowing access to the first borrowed resource via the first account; and restricting the first owned resource via the second account.

16 Claims, 7 Drawing Sheets

500

500

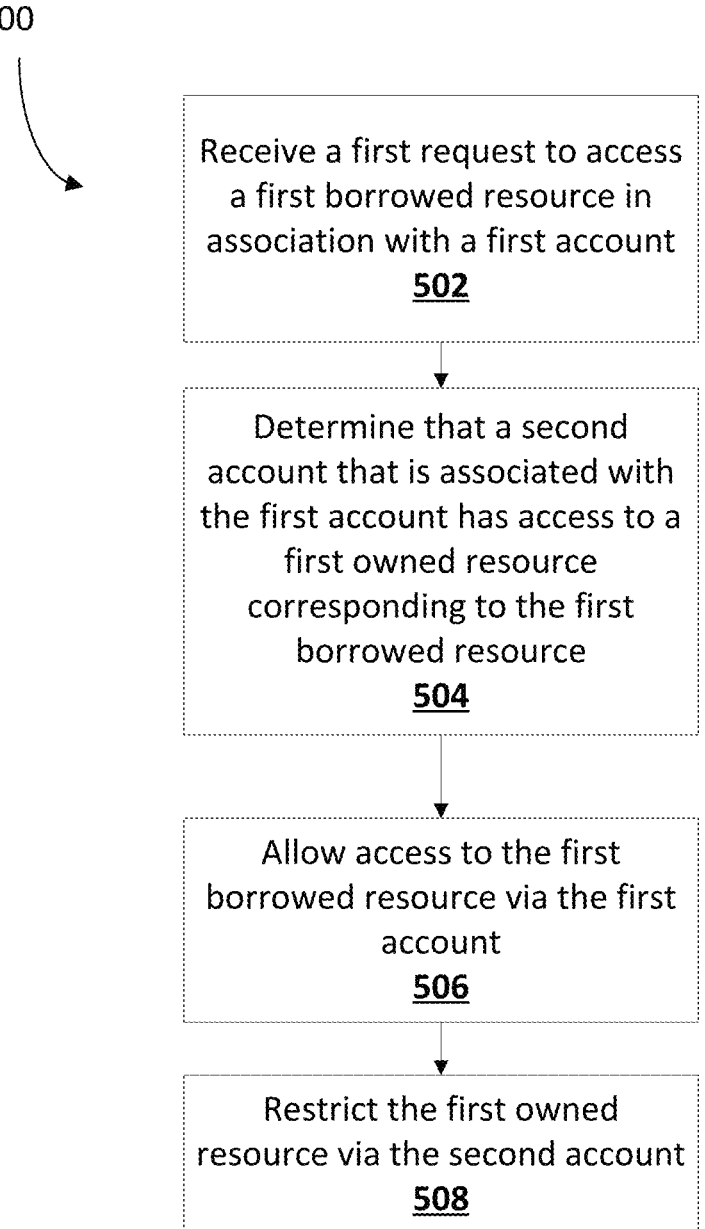

Receive a first request to access a first borrowed resource in association with a first account
502

Determine that a second account that is associated with the first account has access to a first owned resource corresponding to the first borrowed resource
504

Allow access to the first borrowed resource via the first account
506

Restrict the first owned resource via the second account
508

You may not directly access this selected digital resource in your current geographic area.  Would you like to access a temporary copy of this resource instead?

610

620A

620B

600

700

Receive a second request to access a second borrowed resource in association with the first account
702

Determine that the second account does not have access to a second owned resource corresponding to the second borrowed resource
704

Deny the second request
706

800

SYSTEMS AND METHODS FOR SUBSTITUTING BORROWED RESOURCES ON A COMPUTER SYSTEM FOR OWNED RESOURCES

TECHNICAL FIELD

The present application relates to database records and to resources reflected or contained therein and, more particularly, to providing indirect access to owned resources via a proxy database record containing or reflecting borrowed resources.

BACKGROUND

Database records may include or reference one or more resources which may belong to a resource owner. At times, the resource owner may not wish to, or may be unable to, access these resources directly. For example, a resource owner may own a particular digital good, but due to geographic restrictions imposed, may be unable to directly access this owned resource. Systems and methods for indirectly accessing database record resources and therefore desired.

BRIEF DESCRIPTION OF THE DRAWINGS

Embodiments are described in detail below, with reference to the following drawings:

FIG. 5 is a flow chart showing operations performed by a first server;

Like reference numerals are used in the drawings to denote like elements and features.

DETAILED DESCRIPTION OF VARIOUS EMBODIMENTS

Figure 1:
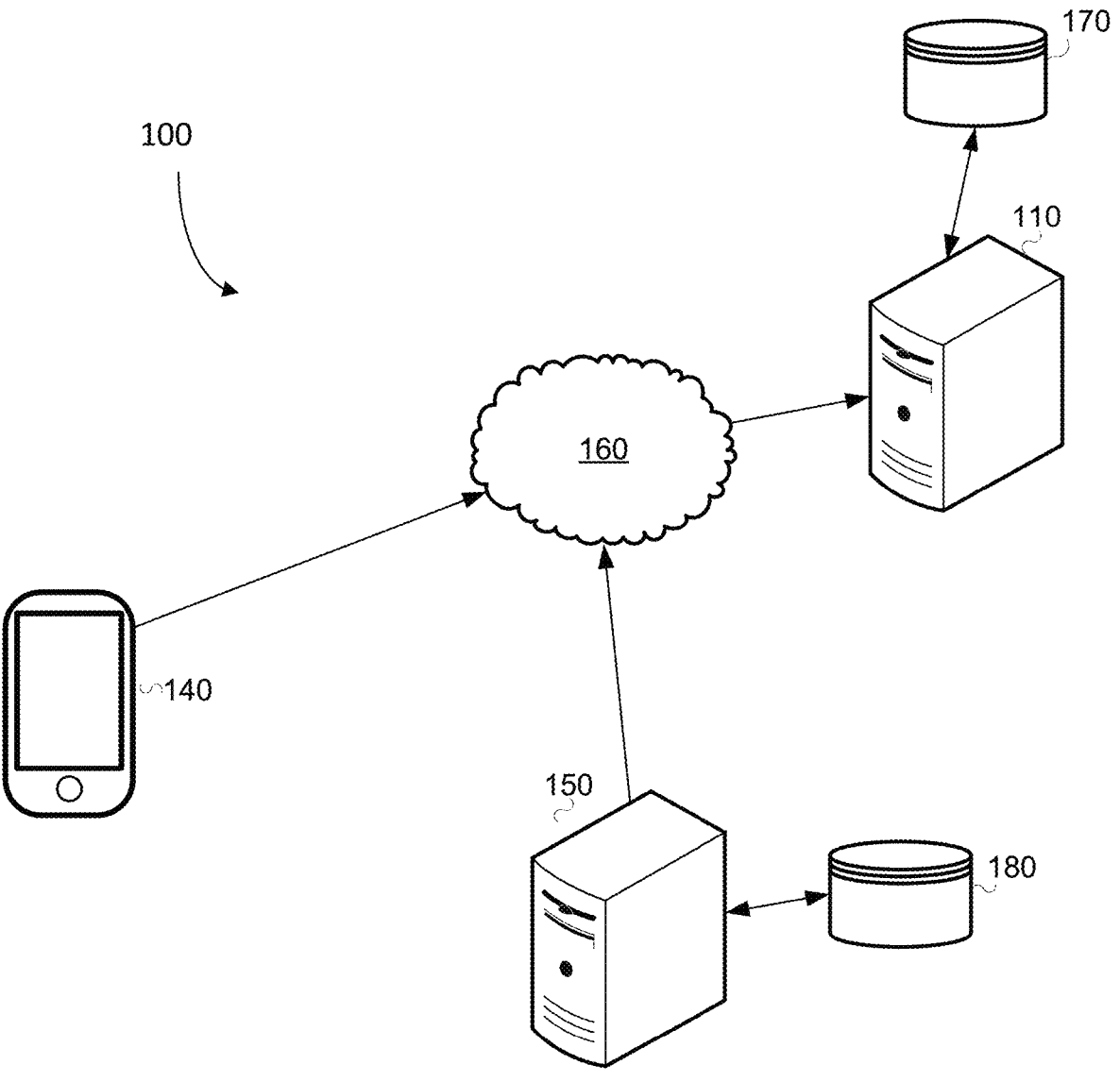
FIG. 1 is a schematic operation diagram illustrating an operating environment of an example embodiment.

According to the subject-matter of the present application, there may be provided a computer system. The computer system may comprise a processor, a communications module coupled to the processor, and a memory module coupled to the processor and storing instructions that, when executed by the processor, cause the computer system to: receive a first request to access a first borrowed resource in association with a first account, determine that a second account that is associated with the first account has access to a first owned resource corresponding to the first borrowed resource, and in response to determining that the second account has access to the first owned resource: allow access to the first borrowed resource via the first account; and restrict the first owned resource via the second account.

In some implementations, the first borrowed resource may be one or more of a computing resource, a database resource, and a digital good having a digital rights management lock.

In some implementations, the instructions, when executed by the processor, further cause the computer system to: receive a second request to access a second borrowed resource in association with the first account, determine that the second account does not have access to a second owned resource corresponding to the second borrowed resource, and in response to determining that the second account does not have access to the second owned resource corresponding to the second borrowed resource, deny the second request.

In some implementations, the instructions, when executed by the processor, further cause the computer system to: send an electronic notification to a resource usage tracking server, the electronic notification based on allowing access to the first borrowed resource via the first account.

In some implementations, restricting access to the first owned resource includes placing a technological lock on the first owned resource.

In some implementations, the technological lock prevents use of the first owned resource while the first borrowed resource is in use.

In some implementations, the instructions, when executed by the processor, further cause the computer system to: detect occurrence of a trigger condition, and in response to detecting occurrence of the trigger condition: transfer at least part of the first owned resource from the second account to the first account.

In some implementations, the computer system of claim 7, wherein the instructions, when executed by the processor, further cause the computer system to: send an electronic indication to a resource usage tracking server, the electronic indication based on the transfer of the at least part of the first owned resource from the second account to the first account.

In some implementations, the trigger condition occurs when a quantity of resources borrowed satisfies defined criteria.

In some implementations, the trigger condition occurs at a scheduled time.

In some implementations, the trigger condition occurs as a result of a user-defined preference.

According to the subject-matter of the present application, there may be provided a method. The method may comprise: receiving a first request to access a first borrowed resource in association with a first account, determining that a second account that is associated with the first account has access to a first owned resource corresponding to the first borrowed resource; and in response to determining that the second account has access to the first owned resource: allowing access to the first borrowed resource via the first account; and restricting the first owned resource via the second account.

In some implementations, the first borrowed resource is one or more of a computing resource, a database resource, a digital good having a digital rights management lock.

In some implementations, the method further comprises: receiving a second request to access a second borrowed resource in association with the first account, determining that the second account does not have access to a second owned resource corresponding to the second borrowed resource, and in response to determining that the second account does not have access to the second owned resource corresponding to the second borrowed resource, denying the second request.

In some implementations the method further comprises sending an electronic notification to a resource usage tracking server, the electronic notification based on allowing access to the first borrowed resource via the first account.

In some implementations, restricting access to the first owned resource includes placing a technological lock on the first owned resource.

In some implementations, the technological lock prevents use of the first owned resource while the first borrowed resource is in use.

In some implementations the method further comprises: detecting occurrence of a trigger condition, and in response to detecting occurrence of the trigger condition, transferring at least part of the first owned resource from the second account to the first account.

In some implementations, the method further comprises sending an electronic indication to a resource usage tracking server, the electronic indication based on the transfer of the at least part of the first owned resource from the second account to the first account.

According to the subject-matter of the present application, there may be provided a non-transitory computer-readable storage medium. The medium may store instructions that, when executed by a processor of a computing device, cause the computing device to: receive a first request to access a first borrowed resource in association with a first account, determine that a second account that is associated with the first account has access to a first owned resource corresponding to the first borrowed resource; and in response to determining that the second account has access to the first owned resource, allow access to the first borrowed resource via the first account, and restrict the first owned resource via the second account.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, the system 100 includes a first server 110, a borrowed resource initiation device 140 and a second server 150 in communication via a network 160.

Each of the first server 110, the borrowed resource initiation device 140 and the second server 150 may be in geographically disparate locations. Put differently, one or more of the first server 110, the borrowed resource initiation device 140 and the second server 150 may be remote to others of the first server 110 the borrowed resource initiation device 140 and the second server 150.

The first server 110, the borrowed resource initiation device 140, and the second server 150 are computer systems. Computer systems may be, for example, a mainframe computer, a minicomputer, or the like. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The first server 110 may be a single server, multiple servers, a server farm, or any other such arrangement of computing devices to implement computing server-like functionality. In some embodiments, the first server 110 may track, manage, and maintain owned resources belonging to an entity, and may track, manage, maintain and lend borrowed resources to the entity. The resources may be represented in a database. For example, the first server 110 may be coupled to a first database 170 which may be provided in secure storage. The secure storage may be provided internally within the first server 110 or externally. The secure storage may, for example, be provided remotely from the first server 110. For example, the secure storage may include one or more data centers. The data centers may, for example, store data with bank-grade security.

The resources may, for example, be computing resources, such as memory or processor cycles. Additionally or alternatively, the resources may be digital goods, such as digital media resources; fonts, logos, photos and graphics; digital subscriptions; online advertisements; internet coupons; electronic tickets; electronic documentation; downloadable software and/or mobile apps; cloud-based applications and online games; virtual tmods used within the virtual economies of online games and communities; workbooks; worksheets; planners; e-learning (online courses); webinars, video tutorials; blog posts; cards; patterns; website themes; and/or templates. Examples of digital media resources include e-books, downloadable music, internet radio, internet television and/or streaming media. By way of further example, the resources may be database resources, and may represent stored value, such as financial instruments, including fiat currency and cryptocurrency.

The first database 170 may include records for a plurality of accounts and at least some of the records may define a quantity of resources associated with an entity. The records may reflect a quantity of stored resources that are associated with the entity. Such resources may include owned resources and, in at least some embodiments, borrowed resources. The amount of resources that are available to or associated with an entity may be reflected by a resource definition defined in an associated record. The resource definition may be or include a balance defined in an associated record; for example a bank balance. In some implementations, the resource definition may define one or more digital goods that is associated with the entity.

An entity may be associated with one or more accounts storing or otherwise reflecting owned resources, i.e., an owned resource account, and/or with one or more accounts storing or otherwise reflecting borrowed resources, i.e., a borrowed resource account. The borrowed resources may, in some embodiments, represent an amount of credit that is available to the entity or digital goods or computer resources that are not owned by the entity but that can be or have been borrowed by the entity.

In some embodiments, the first server 110 may, for example, be a digital media resource server and the entity may be a customer of an institution operating the digital media resource server. In some embodiments, the first server 110 may, for example, be a financial institution server and the entity may be a customer of a financial institution operating the financial institution server.

The borrowed resource initiation device 140 is also a computing device. In some embodiments, the borrowed resource initiation device 140 may, as illustrated, be a personal computer such as a smart phone. However, the borrowed resource initiation device 140 may be a computing device of another type such as a laptop computer, a desktop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the borrowed resource initiation device 140 may be associated with one or more users. The one or more users may be associated with an entity, such as a user or client, having resources associated with the first server 110. In some implementations, a user may operate the borrowed resource initiation device 140 to cause the borrowed resource initiation device 140 to perform one or more operations consistent with the disclosed embodiments. In some embodiments, the borrowed resource initiation device 140 may include a smart card, chip card, integrated circuit card (ICC), and/or other card having an embedded integrated circuit.

In some embodiments, the borrowed resource initiation device 140 may be an automated banking machine (ATM), a point of sale (POS) terminal, or a server. In embodiments where the borrowed resource initiation device 140 is a server, the borrowed resource initiation device 140 may be the first server 110, or a third server.

The second server 150 may be a resource usage tracking server. The second server 150 may maintain a history of borrowing of resources by various entities including, for example, the entity, such as a user or client, that is associated with an account having one or more records in the first database 170.

For example, the second server 150 may maintain historical resource usage data associated with the various entities. Such data may be maintained on a per-entity basis, with each entity having its own associated historical resource usage data. The historical resource usage data may identify, for example, third parties that have a credit relationship with the entity associated with a particular instance of the historical resource usage data, such as a particular record of the historical resource usage data. The historical resource usage data may, for example, be a credit report. A credit report is a record of a borrower's credit history from a number of sources including, for example, credit card companies, banks, collection agencies and/or governments. The historical resource usage data, such as the credit report, may identify various resource event data including, any one or a combination of: a borrowed resource history (such as a credit history), a resource transfer history (such as a record of payments including, for example, an indication of whether such payments were on time or late), failed transfer information (such as information regarding cheques that were returned for having non-sufficient funds and/or information about accounts that were sent to a collection agency, bureau or process due to non-transfer of resources), resource shortage information (such as data regarding prior bankruptcies or other data indicating that an entity had insufficient resources to satisfy data transfer requirements), borrowed resource information (such as information about loans including secured and unsecured loans), and/or data of another type.

The historical usage data may be represented in a second database 180. For example, the second server 150 may be coupled to a second database 180 which may be provided in secure storage. The secure storage may be provided internally within the second server 150 or externally. The secure storage may, for example, be provided remotely from the second server 150. For example, the secure storage may include one or more data centers. The data centers may, for example, store data with bank-grade security.

The historical resource usage data may include other information instead of or in addition to the information defined above. For example, the historical resource usage data may include a listing of third parties that have previously retrieved and/or requested historical resource usage data maintained by the second server 150 (e.g., a listing of third parties that previously requested a credit report). By way of further example, the historical resource usage data may include identification and/or biographical information for the entity. Such information may include, for example, any one or more of: a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), or other information.

Various entries of data, such as, for example, the resource event data, may include a date associated therewith. The date may, for example, be a reporting and/or verification date. The date may reflect freshness of the associated entry of data such that entries with a more recent date may be considered to be fresher that entries with an older date.

The second server 150 may include an application programming interface (API) which allows the first server 110 to send, request, and receive historical resource usage data for an entity. By way of example, the API may allow the first server 110 to send one or more electronic indications to the second server. The one or more electronic indications may include information about resource usage associated with one or more borrowed resource accounts for which records are stored by the first database 170. For example, the one or more electronic indications may be based on allowing access to a first borrowed resource. Additionally or alternatively, the one or more electronic indications may be based on a transfer of at least part of a first owned resource from a second account to a first account. The electronic indications may also be referred to herein as electronic notifications.

The second server 150 may maintain metrics of trust. The metrics of trust may an electronic indication of how trusted a particular entity or computer system is. The metrics of trust may be based on past borrowing activity. For example, a computer system or entity that has safely borrowed resources in the past may be considered more trustworthy than a computer system or entity that has not borrowed resources or that was unsuccessful in borrowing resources in the past. The metrics of trust may be used by some computer systems to determine whether a future request to borrow a resource will be permitted.

In some embodiments, an entity associated with a first account may request access to a first borrowed resource in association with the first account. The first server 110 may receive this request via the borrowed resource initiation device 140. In implementations where the first server 110 allows the request for access, the first server 110 may subsequently send an electronic notification to a resource usage tracking server, (such as the second server 150). The electronic notification may be based on allowing access to the first borrowed resource via the first account. In some implementations, the electronic notification may be a report. In some implementations, the electronic notification may include the type and quantity of the first borrowed amount, an identification of the first account, the date the access was allowed, and information reuarding an entity associated with the first account, such as a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), and/or other information. Where the borrowed resource is a digital good, the notification may identify the digital good borrowed and, where the borrowed resource is a computing resource, the notification may identify an amount of computing resources borrowed.

Electronic notifications may be sent by the first server to the second server in other instances. As a further example, a transfer of at least part of a first owned resource associated with a second account may be transferred from the second account to the first account. The first server 110 may execute this transfer. In some implementations, the first server 110 may execute this transfer in response to a trigger condition. Subsequent to executing this transfer, the first server 110 may send an electronic notification to a resource usage tracking server, (such as the second server 150). The electronic notification may be based on the transfer of the at least part of the first owned resource from the second account to the first account. In some implementations, the electronic notification may be a report. In some implementations, the electronic notification may include the type and quantity of the at least part of the first owned resource, an identification of the first account, an identification of the second account, the date of the transfer, and information regarding an entity associated with the first account, such as a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), and/or other information.

Figure 2:
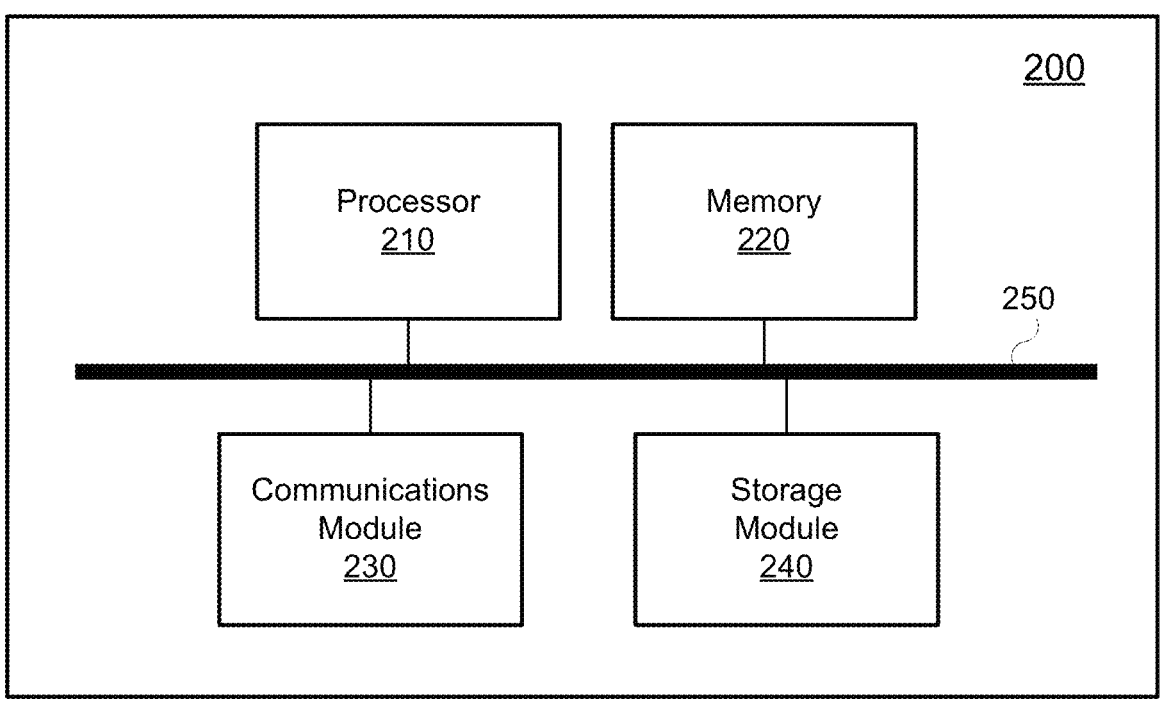
FIG. 2 is a high-level operation diagram of an example computing device.

Referring now to FIG. 2, a high-level operation diagram of an example computing device 200 will now be described. The example computing device 200 may be exemplary of the first server 110, the borrowed resource initiation device 140 and/or the second server 150.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EA/DO), Long-term Evolution (LTE) or the like.

Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The example computing device 200 will include other components apart from those illustrated in FIG. 2 and the specific component set may differ based on whether the example computing device 200 is operating as the first server 110, the borrowed resource initiation device 140 and/or the second server 150. For example, the example computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the example computing device 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

In embodiments where the borrowed resource initiation device 140 is a point of sale (POS) terminal, the example computing device 200 may operate as a POS terminal. In such embodiments, the example computing device 200 may include a physical token reader. The physical token reader may be configured for reading a physical token such as a value transfer card or a mobile device having a representation of a value transfer card stored thereon. The physical token reader may be or include a card slot which facilitates communication with the physical token through physical contact and/or a contactless reader such as a near field communication (NFC) reader which may facilitate communication with the physical token through communication protocols that do not rely on physical contact with the physical token.

In embodiments where the borrowed resource initiation device 140 is an ATM, the computing device may form part of an ATM. In such embodiments, the ATM may also include cassettes, a display, a keypad, an item receiver/dispenser, and a card reader. The display may, for example, be a liquid-crystal display (LCD), a cathode-ray tube (CRT), or the like. The display may be for presenting information such as to a user of the ATM. The display may present information under control of the processor 210.

As noted above, the example computing device 200 may include one or more input modules and/or one or more output modules. For example, where the example computing device 200 is operating as a POS terminal it may include one or more input modules such as a touchscreen display and/or a keypad that may be configured to receive user input. The input modules may be used by an operator, for example. Where the example computing device 200 is operating as a POS terminal, it may also include a display module for displaying a user interface that facilitates payment processing. Where the example computing device 200 forms a part of an ATM, one or more input modules and/or one or more output modules may allow the example computing device 200 to interface with one or more of the display, the keypad, the item receiver/dispenser, and the card reader.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
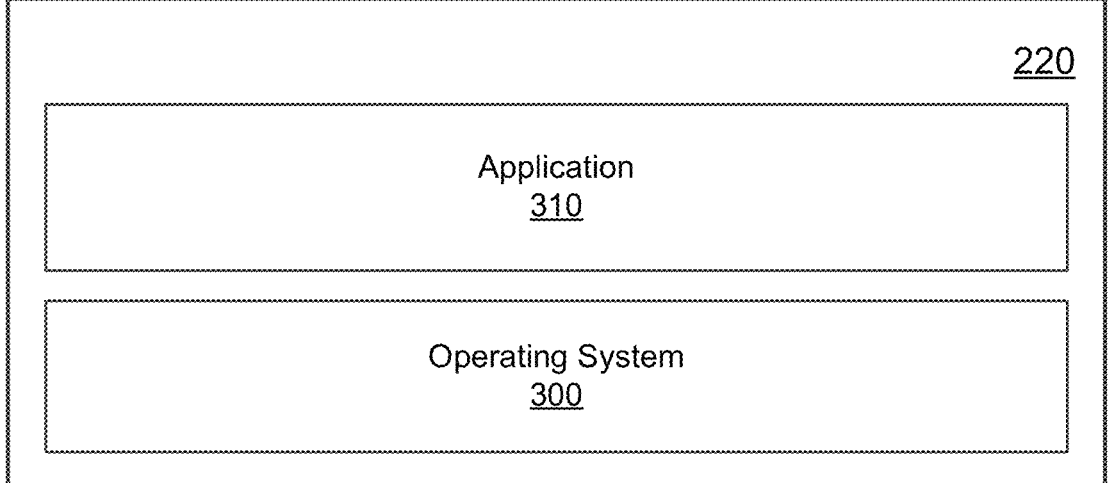
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the first server 110, the borrowed resource initiation device 140 and the second server 150.

Figure 4:
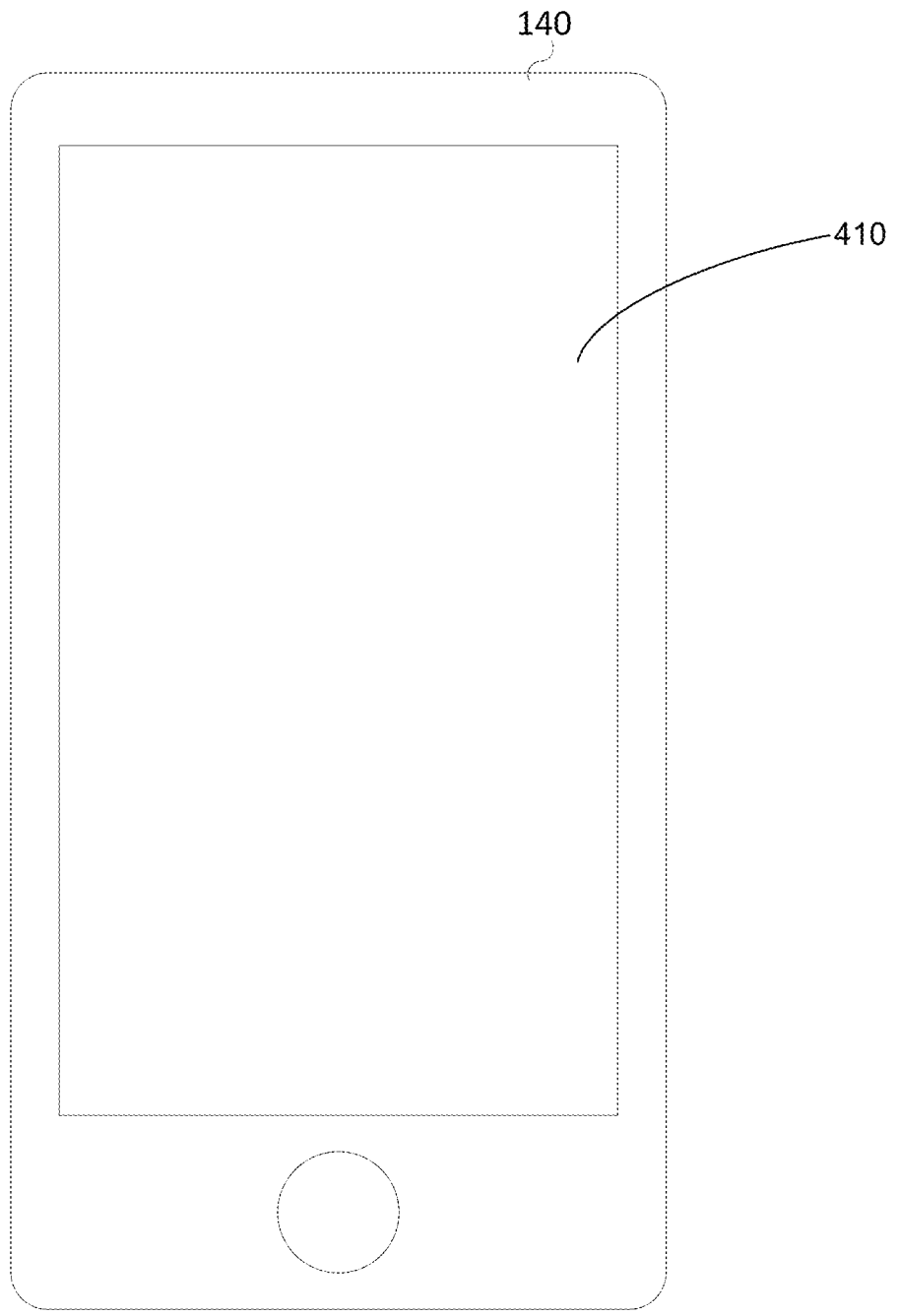
FIG. 4 is an example screen display of a borrowed resource initiation device.

FIG. 4 shows the front of the borrowed resource initiation device 140 of FIG. 1. The borrowed resource initiation device 140 may be a personal computing device, such as a smart phone, as shown in FIG. 4. As previously described, the borrowed resource initiation device 140 may be a computing device of another type such as a laptop computer, a desktop computer, a tablet computer, a notebook computer, a hand-held computer, a personal digital assistant, a portable navigation device, a mobile phone, a wearable computing device. In some embodiments, the borrowed resource initiation device 140 may be an automated banking machine (ATM), a point of sale (POS) terminal, or a server, such as the first server 110, or a third server.

As illustrated, the front of the borrowed resource initiation device 140 includes a display 410. The display 410 is a module of the smart phone embodiment of the borrowed resource initiation device 140. The display 410 is for presenting graphics. The display 410 may be, for example, a liquid crystal display (LCD). In addition to being an output device, the display 410 may also be an input device. For example, the display 410 may allow touch input to be provided to the borrowed resource initiation device 140. In other words, the display 410 may be a touch sensitive display module. In a particular example, the display 410 may be a capacitive touch screen.

The operation of the first server 110 will now be described with reference to the flowchart of FIG. 5 which illustrates a method 500 for allowing access to a first borrowed resource. Operations 502 and onward are performed by one or more processors of a computing device, such as for example the processor 210 of a suitably configured instance of the example computing device 200, executing software such as, for example, a suitable instance of the application 310.

At the operation 502, the first server 110 receives a first request to access a first borrowed resource in association with a first account via a network such as, for example, the network 160. In a particular example, where the first server 110 is a suitably configured embodiment of the example computing device 200, the first server 110 may receive the request using the communications module 230.

The first account, may, for example, be a borrowed resource account. In some embodiments, the borrowed resource account may lend borrowed resources to an entity associated with the first account. The resources may, for example, be computing resources, such as memory or processor cycles. Additionally or alternatively, the resources may be digital goods, such as digital media resources; fonts, logos, photos and graphics; digital subscriptions; online advertisements; internet coupons; electronic tickets; electronic documentation; downloadable software and/or mobile apps; cloud-based applications and online games; virtual goods used within the virtual economies of online games and communities; workbooks; worksheets; planners; e-learning (online courses); webinars, video tutorials; blog posts; cards; patterns; website themes; and/or templates. Examples of digital media resources include e-books, downloadable music, internet radio, internet television and/or streaming media. Additionally or alternatively, the resources may be database resources, such as resources representing stored value. Resources representing stored value may include financial resources including a representation of one or more financial instruments, including fiat currency. The financial resources may be database resources.

The first request may be received from the borrowed resource initiation device 140. In embodiments where the borrowed resource initiation device 140 is a smart phone, the request may originate from a selection by a resource owner through a graphical user interface (GUI) on the smartphone.

In some instances, a resource owner may have ownership of a particular digital good, such as a video file, and may have purchased the digital good in a first geographic region, for example, in the United States. The owned digital good may be stored in in the United States in a second account. The resource owner may subsequently travel to a second geographic region, for example, to Canada, and discover that he is unable to view the owned video file in the second account from his present location. The inability to view the video file may, for example, be caused by a technological lock, such as a digital rights management lock, having been placed on the digital good as a form of geographic restriction.

The technological lock may be a form of one or more digital rights management (DRM) tools or technological protection measures (TPM). DRM tools or TPM are a set of access control technologies for restricting the use of proprietary hardware and copyrighted works. DRM technologies try to control the use, modification, and distribution of copyrighted works (such as software and multimedia content, including digital goods, such as digital media content. Worldwide, many laws have been created which criminalize the circumvention of DRM, communication about such circumvention, and the creation and distribution of tools used for such circumvention. Such laws are part of the United States' Digital Millennium Copyright Act, and the European Union's Information Society Directive.

Common DRM techniques include restrictive licensing agreements involving the access to digital materials, copyright and public domain materials being restricted to consumers as a condition of entering a website or when downloading software. DRM techniques may include encryption, scrambling of expressive material and embedding of a tag, which is designed to control access and reproduction of information, including backup copies for personal use. These technologies have been criticized for restricting individuals from copying or using the content legally, such as by fair use. DRM is in common use by the entertainment industry (e.g., audio and video publishers). Many online music stores, e-book publishers and vendors, such as Over-Drive™, also use DRM, as do cable and satellite service operators, to prevent unauthorized use of content or services.

A regional lockout (or region coding) is a class of DRM preventing the use of a certain product or service, such as multimedia or a hardware device, outside a certain region or territory. A regional lockout may be enforced through physical means, through technological means such as detecting the user's IP address or using an identifying code, or through unintentional means introduced by devices only supporting certain regional technologies (such as video formats, e.g., National Television Standards Committee (NTSC) and Phase Alternating Line (PAL)).

A regional lockout may be enforced for several reasons, such as to stagger the release of a certain product, to avoid losing sales to the product's foreign publisher, to maximize the product's impact in a certain region through localization, to hinder grey market imports by enforcing price discrimination, and/or to prevent users from accessing certain content in their territory because of legal reasons (e.g., due to censorship laws, or because a distributor does not have the rights to certain intellectual property outside their specified region).

In some instances, the placement of digital rights management locks on digital goods may be outside of the control of the digital goods provider. As a result, the digital goods provider may wish to provide resource owners with access to a borrowed resource in these instances. For example, after confirming ownership of a digital good, a digital goods provider may wish to provide a resource owner with the ability to request access to a "free rental" version of the owned digital good via a first account. The digital good provider may wish to do so as a means of honouring the original sale of the digital good to the resource owner without requiring the owner to attempt to circumvent the digital lock or other DRM.

Figure 6:
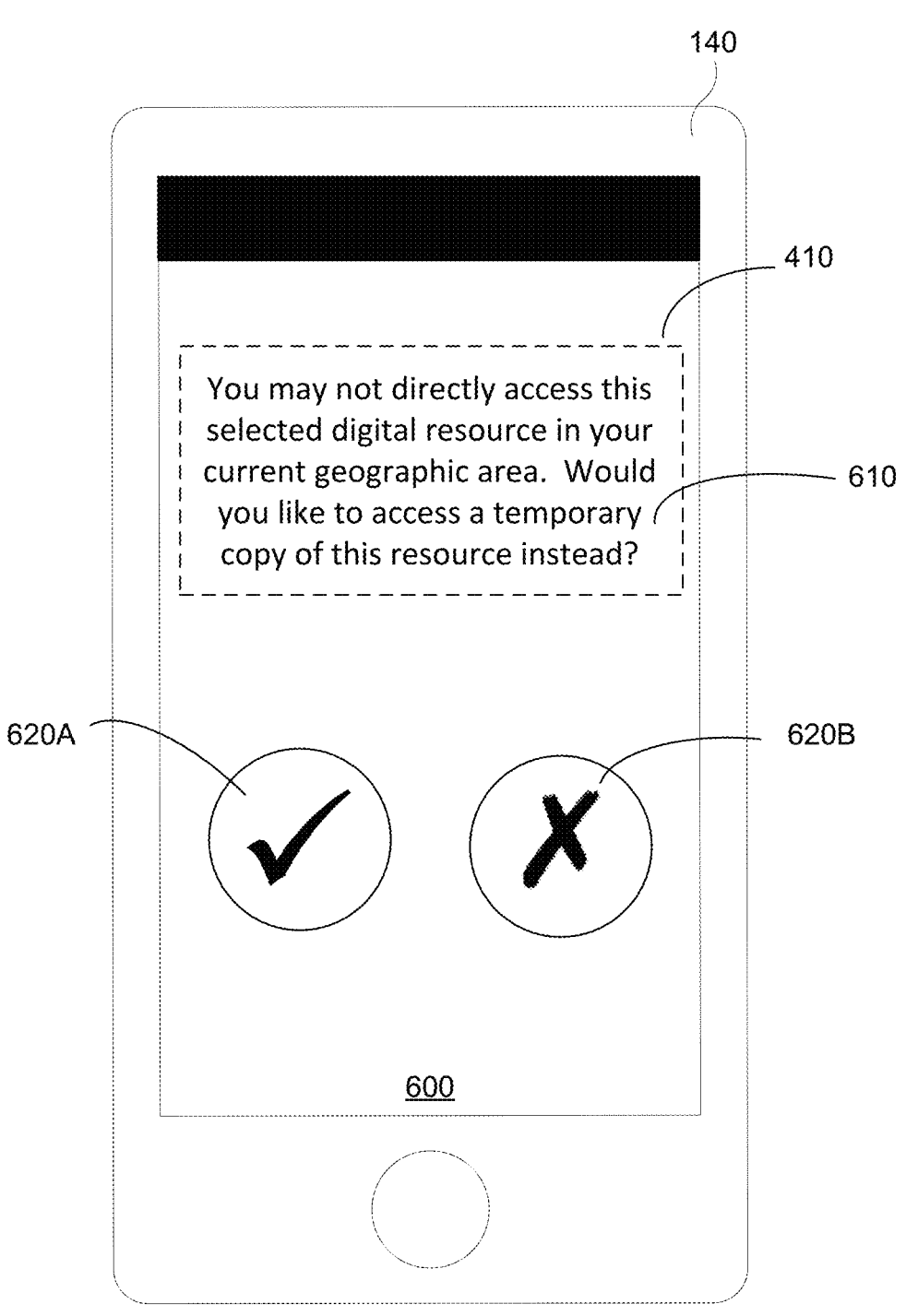
FIG. 6 is an example screen display of a borrowed resource initiation device.

In some embodiments, provision of the ability to request access to a borrowed resource in association with a first account may be provided via a GUI, such as the example GUI 600 illustrated in FIG. 6.

With reference now to FIG. 6, following an attempt to access a particular digital good having a digital rights management lock, a borrowed resource initiation device 140, such as a smart phone, may provide a resource owner with a GUI, such as the example GUI 600. Examples of the provision of a GUI to the resource owner will now be discussed with reference to FIG. 6.

As illustrated, the display 410 of the borrowed resource initiation device 140 may present an example GUI 600. The example GUI 600 includes a prompt 610 and a set of response buttons 620A and 620B.

The prompt 610 may include text such as may correspond to the initialization of a request to access a first borrowed resource received at the operation 502. For example, as illustrated by FIG. 6, the prompt 610 may include text such as "You may not directly access your selected digital resource in your current geographic area. Would you like to access a temporary copy of this resource instead?"

Response buttons 620A and 620B correspond to an agreement to an offer to initialize the request to access the first borrowed resource and a rejection of an offer to initialize the request to access the first borrowed resource, respectively.

In some instances, the techniques described above that allow a borrowed resource account to be used in place of owned resources may be used in banking applications. For example, returning to the description of operation 502 of FIG. 5, as previously described, the first account, may, for example, be a borrowed resource account. In some embodiments, the borrowed resource account may lend borrowed resources to an entity associated with the first account. In embodiments where the resources are database resources such as financial resources, the borrowed resource account may be a credit-based account, and the credit-based account may be used as a chequing account. The borrowed resource account may have a negative balance. The borrowed resource account may have a balance that is equal to zero.

In some implementations where the request to access the first borrowed resource corresponds to a deposit of a cheque that is to be drawn from the first account, the borrowed resource initiation device 140 may be an ATM that has received the cheque for deposit. In some implementations where the request to access the first borrowed resource corresponds to a deposit of a cheque that is to be drawn from the first account, the borrowed resource initiation device 140 may be a server associated with a financial institution that has received the cheque for deposit. The server associated with a financial institution that has received the cheque for deposit may be the first server.

In implementations where the request to access the first borrowed resource corresponds to a transfer initiated at a POS terminal using a payment card linked to the first account, the borrowed resource initiation device 140 may be the POS terminal.

In implementations where the request to access the first borrowed resource corresponds to an initiation of an electronic transfer from the first account, the borrowed resource initiation device 140 may be a computing device associated with an entity having an account having one or more records in the first database 170. The computing device may be a smart phone, a laptop computer, a desktop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), or an embedded computing device.

In implementations where the request to access the first borrowed resource corresponds to an initiation of an ATM withdrawal from the first account, the borrowed resource initiation device 140 may be the ATM.

At the operation 504, the first server determines that a second account that is associated with the first account has access to a first owned resource corresponding to the first borrowed resource.

For example, as previously described, a resource owner may own a particular digital good, but may be unable to directly use this owned resource, due to a technological lock on the digital good. The technological lock may be, for example, a digital rights management lock. As a result, the resource owner may request to access a borrowed version of this digital good via a first account. In such embodiments, the first server, at the operation 504, may determine that a second account that is associated with the first account has access to a first owned resource corresponding to the first borrowed resource. In other words, the first server may determine that the resource owner does indeed own a version of the particular digital good that to which access to a borrowed version is being requested.

In embodiments where the resources are database resources such as financial resources, the first server may determine that a second account, which may be an owned resource account, has access to, or contains, an amount of owned financial resources that meets or exceeds the amount of borrowed financial resources for which access has been requested from the first account. In this way, the second account, which may be an owned resource account, may provide security to the first account, which may be a credit-based account.

Following the determination that a second account that is associated with the first account has access to a first owned resource corresponding to the first borrowed resource, the operation 506 is next.

At operation 506, the first server allows access to the first borrowed resource via the first account.

In some embodiments where the resources are digital goods, allowing access to the first borrowed resource may correspond to allowing a resource owner to view a "free rental" copy of a digital good.

In some embodiments where the resources are database resources such as financial resources, the first borrowed resource may correspond to an amount of credit. In some implementations, allowing access to the first borrowed resource may correspond to a deposit of a cheque that is to be drawn from the first account, a transfer initiated at a POS terminal using a payment card linked to the first account, an initiation of an electronic transfer from the first account, or an initiation of an ATM withdrawal from the first account.

Following allowance of access to the first borrowed resource, control flow proceeds to an operation 508.

At the operation 508, the server restricts the first owned resource via the second account. In embodiments where the first owned resource is a digital good, access to the owned digital good may be restricted, for example, by placing a technological lock, such as a digital rights management lock, on the digital good.

In embodiments where the first owned resource is a balance of resources, such as a balance of currency, the restriction may be implemented by placing a technological lock on at least a portion of owned currency or other financial instruments. The technological lock is an electronic lock that may prevent such resources from being used. For example, the technological lock may prevent a transfer of the locked resources. Since the resources are reflected or maintained by computing devices, the technological lock prevents any computer system from using the locked resources. In some implementations, the technological lock may be or include a hold. In situations where the first borrowed resource is an amount of currency, the first owned resource may be an equivalent amount of owned currency, and the restriction my be implemented by placing a hold the equivalent amount of owned currency. In this way, the restricted owned currency in the second account may provide security for the borrowed currency in the first account.

Restricting access to the first owned resource may prevent use of the first owned resource while the first borrowed resource is in use. For example, in embodiments where the first owned resource is a digital good, access to and use of the owned digital good may be restricted while the borrowed version of the digital good is being accessed. Access to the owned digital good may be restricted by placing a technological lock, such as a digital rights management lock, on the digital good. As a further example, in embodiments where the first owned resource is a financial instrument, use of the owned financial instrument may be restricted while the borrowed resource is in use. The owned financial instrument may be restricted by placing a hold on the owned financial instrument.

It will be noted that multiple instances of the method 500 may be implemented with respect to the first and second accounts. In this way, the first account may be associated with multiple borrowed resources. In this way, multiple owned resources may be restricted via the second account.

Figure 7:
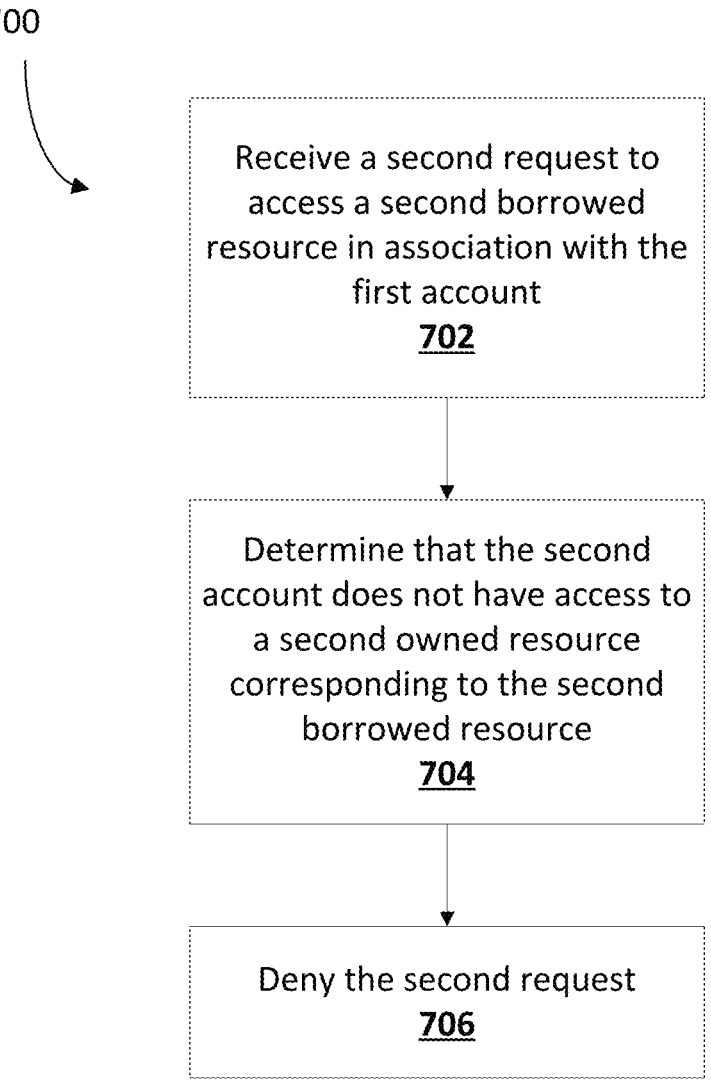
FIG. 7 is a flow chart showing operations performed by a first server.

Referring now to FIG. 7, the operation of the first server 110 will now be described with reference to a method 700. Operations 702 and onward are performed by one or more processors of a computing device, such as for example the processor 210 of a suitably configured instance of the example computing device 200, executing software such as, for example, a suitable instance of the application 310.

At the operation 702, the first server 110 receives a second request to access a second borrowed resource in association with the first account via a network such as, for example, the network 160. In a particular example, where the first server 110 is a suitably configured embodiment of the example computing device 200, the first server 110 may receive the request using the communications module 230.

The second request may be received from the borrowed resource initiation device 140. In embodiments where the borrowed resource initiation device 140 is a smart phone, the request may originate from a selection by a resource owner through a graphical user interface (GUI) on the smartphone, such as the example GUI 600 illustrated in FIG. 6 and described above.

As previously described with respect to operation 502 of FIG. 5, the first account, may, for example, be a borrowed resource account. In some embodiments, the borrowed resource account may lend borrowed resources to an entity associated with the first account, which may be an owned resource account. In embodiments where the resources are database resources, such as financial resources, the borrowed resource account may be a credit-based account, and the credit-based account may be used as a chequing account. The borrowed resource account may have a negative balance. The borrowed resource account may have a balance that is equal to zero.

In some such embodiments, the second request may include, for example, a processing of a deposit of a cheque that is to be drawn from the first account, a transfer initiated at a POS terminal using a payment card linked to the first account, an electronic transfer, or an ATM withdrawal.

At the operation 704, the first server determines that a second account that is associated with the first account does not have access to a second owned resource corresponding to the second borrowed resource.

For example, a user may attempt to borrow a particular digital good from a first account, free of charge, under the pretense that the user owns a version of the particular digital good, when in fact, he does not. Under these circumstances, the first server may receive a second request to access a second borrowed resource (in this case, a borrowed digital good) in association with the first account. However, in these circumstances, the server may determine that the second account does not have access to a second owned resource (in this case, an owned digital good) corresponding to the second borrowed resource.

As another example, a user may attempt to access a particular amount of financial credit from a first account. Under these circumstances, the first server may receive a second request to access a second borrowed resource (in this case, an amount of financial credit) in association with the first account. However, in these circumstances, the server may determine that the second account does not have access to a second owned resource (in this case, an owned amount of financial resources) corresponding to the second borrowed resource (in this case, the requested amount of financial credit).

At operation 706, the first server denies the second request. For example, subsequent to determining that a second account does not have access to an owned version of a particular digital good, the server denies the request to access a borrowed copy of the particular digital good in association with the first account. As another example, subsequent to determining that a second account does not have access to a particular owned amount of financial resources, the server denies the request to access the particular borrowed amount of financial resources (e.g., credit).

Figure 8:
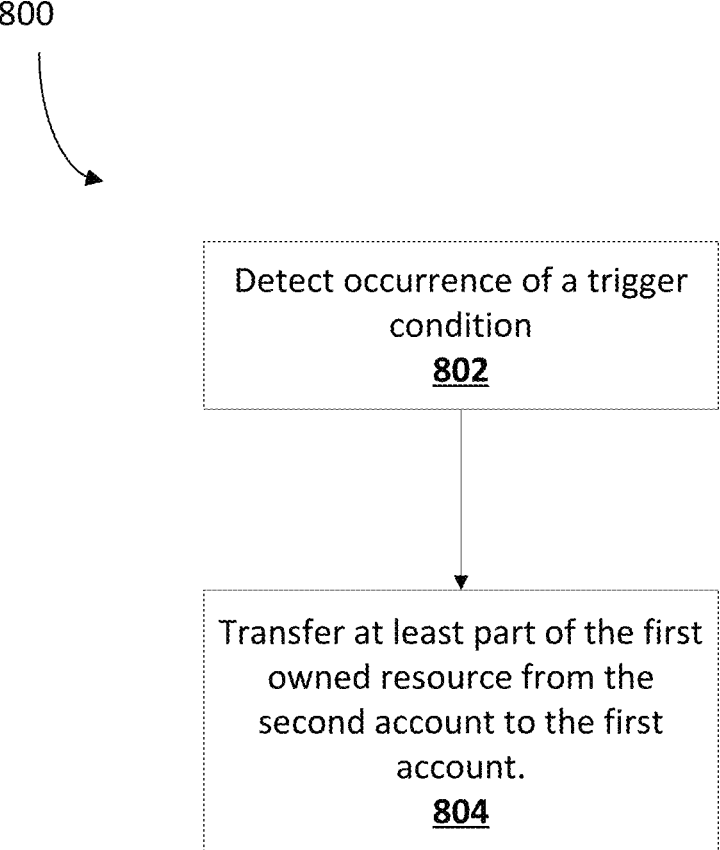
FIG. 8 is a flow chart showing operations performed by a first server.

Referring now to FIG. 8, the operation of the first server 110 will now be described with reference to a method 800. Operations 802 and 804 are performed by one or more processors of a computing device, such as for example the processor 210 of a suitably configured instance of the example computing device 200, executing software such as, for example, a suitable instance of the application 310.

At the operation 802, the first server 110 detects occurrence of a trigger condition. The trigger condition may occur when a quantity of resources borrowed satisfies defined criteria. In some implementations, the defined criteria may include a particular fixed quantity, and the particular fixed quantity may be expressed, for example, as a dollar amount, such as, for example, $500.00 or $1000.00. In such implementations, the trigger condition may occur when the quantity of resources borrowed is equal to or greater than $500.00 or $1000.00.

In some implementations, the defined criteria may include a variable quantity. For example, the defined criteria may include a quantity that is proportional to a total amount of owned resources that the second account has access to at a particular time. It may be that the defined criteria include, for example, fifty percent of the total amount of owned resources that the second account has access to at a particular time. In such implementations, the trigger condition may occur when the quantity of resources borrowed is equal to or greater than the variable quantity, for example, when the quantity of resources borrowed is equal to or greater than fifty percent of the total amount of owned resources that the second account has access to at a particular time.

As another example, the defined criteria may include a variable quantity that is proportional to an average, such as a rolling average, of a quantity of owned resources accessible to the second account over a particular period of time. It may be that the defined criteria include, for example, fifty percent of the rolling average of owned resources that the second account has access to over a particular period of time. In such implementations, the trigger condition may occur when the quantity of resources borrowed is equal to or greater than the variable quantity, for example, when the quantity of resources borrowed is equal to or greater than fifty percent of the rolling average of owned resources that the second account has access to over a particular period of time.

In some embodiments, the trigger condition may occur at a predetermined or scheduled time. For example, the trigger condition may occur monthly, such as on a particular day of every month. As another example, the trigger condition may occur biweekly. In some embodiments where the trigger condition occurs at a predetermined or scheduled time, the predetermined or scheduled times may be prescribed by the first server.

In some embodiments, the trigger condition may occur as a result of a user-defined preference. A user associated with an entity associated with the second account may be able to invoke the occurrence of the trigger condition via, for example, a user interface provided by the borrowed resource initiation device 140. For example, a user may prescribe a schedule of periodic "automatic payments", similar to the manner in which a user might arrange payments for a fitness membership, or payments with respect to an auto loan.

Subsequent to the detection of the trigger condition by the first server 110, at operation 804, the first server 110 transfers at least part of the first owned resource from the second account to the first account. The amount of the at least part of the first owned resource that is transferred may vary. In some implementations, the transferred quantity may be equal to the particular fixed quantity or to the particular variable quantity included in the defined criteria. In some implementations, the transferred quantity may be equal to the amount of the first borrowed resource. In some implementations, the transferred quantity may be equal to a predetermined fixed amount, such as $50.00 or $100.00. In some implementations, the transferred quantity may be equal to a predetermined variable amount, such as a particular percentage of the amount of the first borrowed resource.

As previously noted, in some embodiments, the trigger condition may occur as a result of a user-defined preference. A user may be able to invoke the occurrence of the trigger condition to cause the first server 110 to transfer at least part of the first owned resource from the second account to the first account. In addition, the user may be able to define the transferred quantity. For example, a user may be able to select the date, time and amount of a transfer from the second account to the first account via, for example, a GUI provided on the display 410 of the borrowed resource initiation device 140. The borrowed resource initiation device 140 may be, for example a smart phone as shown in FIG. 4.

As previously noted, multiple instances of the method 500 may be implemented with respect to the first and second accounts. In this way, the first account may be associated with multiple borrowed resources and multiple owned resources may be restricted via the second account. In some embodiments, the quantity of resources borrowed may refer to a quantity of financial resources borrowed. For example, a first instance of the method 500 may result in the first account being associated with a quantity of financial resources borrowed equal to $270.00. A second instance of the method 500 may result in the first account being associated with an additional quantity of financial resources borrowed equal to $305.00. As a result, after the second instance of the method 500, the first account may be associated with a total quantity of financial resources borrowed equal to $575.00.

In an embodiment where the defined criteria include a particular fixed quantity, and where the particular fixed quantity is $500.00, the trigger condition may occur as a result of the second instance of the method 500 (i.e., with the borrowing of the quantity of financial resources equal to $305.00). In this particular example, the trigger condition may occur at this time because it is after the second instance of the method 500 that the quantity of resources borrowed is equal to or greater than $500.00 (the total quantity of financial resources borrowed is equal to $575.00).

As previously described, subsequent to executing a transfer from the second account to the first account, the first server 110 may send an electronic notification to a resource usage tracking server, (such as the second server 150). The electronic notification may be based on the transfer of the at least part of the first owned resource from the second account to the first account. In some implementations, the electronic notification may be a report. In some implementations, the electronic notification may include the type and quantity of the at least part of the first owned resource, an identification of the first account, an identification of the second account, the date of the transfer, and information regarding an entity associated with the first account, such as a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), and/or other information.

As has also been noted, the first server may send an electronic notification to a resource usage tracking server at other times. For example, the first server may send an electronic notification to a resource tracking server following allowing access to the first borrowed resource via the first account, as described in accordance with the method 500 of FIG. 5. In such implementations, the electronic notification may be based on allowing access to the first borrowed resource via the first account. In this way, an entity associated with the first account may build a credit history based on access to the first borrowed resource via the first account.

Conveniently, at least some of the embodiments described herein may allow access to a borrowed resource when an equivalent owned resource is unavailable for any reason.

Further, at least some of the implementations described herein may allow a credit-based account to be used by a party not generally eligible to access credit. The available credit in the credit-based account may be dynamic, varying with a balance in a non-credit account. This may, for example, allow a customer to build their credit rating. In this way, at least some of the implementations described herein may provide an adjustable secured credit-based account.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:

a processor;

a communications module coupled to the processor; and a memory module coupled to the processor and storing instructions that, when executed by the processor, cause the computer system to:

receive a first request to access a first borrowed resource in association with a first account, the first account being a borrowed resource account which lends resources;

in response to receiving the first request, determine that a second account that is associated with the first account, by being associated with a common entity, has access to a first owned resource corresponding to the first borrowed resource, wherein the first owned resource is an equivalent resource to the first borrowed resource and distinct from the first borrowed resource; and in response to determining that the second account has access to the first owned resource:

allow access to the first borrowed resource via the first account; and place a technological lock on the first owned resource, wherein the technological lock prevents use of the first owned resource while the first borrowed resource is in use.

2. The computer system of claim 1, wherein the first borrowed resource is one or more of a computing resource, a database resource, and a digital good having a digital rights management lock.

3. The computer system of claim 1, wherein the instructions, when executed by the processor, further cause the computer system to:

receive a second request to access a second borrowed resource in association with the first account;

determine that the second account does not have access to a second owned resource corresponding to the second borrowed resource; and in response to determining that the second account does not have access to the second owned resource corresponding to the second borrowed resource:

deny the second request.

4. The computer system of claim 1, wherein the instructions, when executed by the processor, further cause the computer system to:

send an electronic notification to a resource usage tracking server, the electronic notification based on allowing access to the first borrowed resource via the first account.

5. The computer system of claim 1, wherein the instructions, when executed by the processor, further cause the computer system to:

detect occurrence of a trigger condition; and in response to detecting occurrence of the trigger condition:

transfer at least part of the first owned resource from the second account to the first account.

6. The computer system of claim 5, wherein the instructions, when executed by the processor, further cause the computer system to:

send an electronic indication to a resource usage tracking server, the electronic indication based on the transfer of the at least part of the first owned resource from the second account to the first account.

7. The computer system of claim 5, wherein the trigger condition occurs when a quantity of resources borrowed satisfies defined criteria.

8. The computer system of claim 5, wherein the trigger condition occurs at a scheduled time.

9. The computer system of claim 5, wherein the trigger condition occurs as a result of a user-defined preference.

10. A method comprising:

receiving a first request to access a first borrowed resource in association with a first account, the first account being a borrowed resource account which lends resources;

in response to receiving the first request, determining that a second account that is associated with the first account, by being associated with a common entity, has access to a first owned resource corresponding to the first borrowed resource, wherein the first owned resource is an equivalent resource to the first borrowed resource and distinct from the first borrowed resource; and in response to determining that the second account has access to the first owned resource:

allowing access to the first borrowed resource via the first account; and placing a technological lock on the first owned resource, wherein the technological lock prevents use of the first owned resource while the first borrowed resource is in use.

11. The method of claim 10, wherein the first borrowed resource is one or more of a computing resource, a database resource, and a digital good having a digital rights management lock.

12. The method of claim 10, further comprising:

receiving a second request to access a second borrowed resource in association with the first account;

determining that the second account does not have access to a second owned resource corresponding to the second borrowed resource; and in response to determining that the second account does not have access to the second owned resource corresponding to the second borrowed resource:

denying the second request.

13. The method of claim 10, further comprising:

sending a report to a resource usage tracking server, the report based on allowing access to the first borrowed resource via the first account.

14. The method of claim 10, further comprising:

detecting occurrence of a trigger condition; and in response to detecting occurrence of the trigger condition:

transferring at least part of the first owned resource from the second account to the first account.

15. The method of claim 14, further comprising:

sending an electronic indication to a resource usage tracking server, the electronic indication based on the transfer of the at least part of the first owned resource from the second account to the first account.

16. A non-transitory computer-readable storage medium storing instructions that, when executed by a processor of a computing device, cause the computing device to:

receive a first request to access a first borrowed resource in association with a first account, the first account being a borrowed resource account which lends resources;

in response to receiving the first request, determine that a second account that is associated with the first account, by being associated with a common entity, has access to a first owned resource corresponding to the first borrowed resource, wherein the first owned resource is an equivalent resource to the first borrowed resource and distinct from the first borrowed resource; and in response to determining that the second account has access to the first owned resource:

allow access to the first borrowed resource via the first account; and place a technological lock on the first owned resource, wherein the technological lock prevents use of the first owned resource while the first borrowed resource is in use.

* * * * *